(12) United States Patent
Dong et al.

(10) Patent No.: US 9,378,081 B2
(45) Date of Patent: Jun. 28, 2016

(54) BIT REMAPPING SYSTEM

(71) Applicant: QUALCOMM Incorporated, San Diego, CA (US)

(72) Inventors: Xiangyu Dong, San Diego, CA (US); Jung Pill Kim, San Diego, CA (US); Mosaddiq Saifuddin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 190 days.

(21) Appl. No.: 14/146,628

(22) Filed: Jan. 2, 2014

(65) Prior Publication Data

US 2015/0186198 A1 Jul. 2, 2015

(51) Int. Cl.
*G11C 29/00* (2006.01)
*G06F 11/07* (2006.01)
*G06F 11/10* (2006.01)
*G06F 12/00* (2006.01)
*G06F 13/16* (2006.01)

(52) U.S. Cl.
CPC .......... *G06F 11/076* (2013.01); *G06F 11/1048* (2013.01); *G06F 11/1076* (2013.01); *G06F 12/00* (2013.01); *G06F 13/16* (2013.01); *G06F 2201/88* (2013.01)

(58) Field of Classification Search
CPC .............. G06F 11/076; G06F 11/1076; G06F 11/1048; G06F 12/00; G06F 2201/88; G06F 3/0617; G06F 3/0638; G06F 3/0683; G06F 11/1008; G11C 16/34; G11C 16/349; G11C 2029/0411; G11C 2029/0409; G11C 29/76
See application file for complete search history.

(56) References Cited

U.S. PATENT DOCUMENTS

| | | | |
|---|---|---|---|
| 5,912,906 A | 6/1999 | Wu et al. | |
| 6,119,245 A | 9/2000 | Hiratsuka | |
| 6,651,212 B1 | 11/2003 | Katayama et al. | |
| 6,996,017 B2 | 2/2006 | Scheuerlein et al. | |
| 7,096,407 B2 | 8/2006 | Olarig | |
| 7,266,747 B2 | 9/2007 | Foss | |
| 7,310,278 B2 | 12/2007 | Bright et al. | |
| 7,408,824 B2 | 8/2008 | Hoya et al. | |

(Continued)

FOREIGN PATENT DOCUMENTS

JP          2001175542 A      6/2001

OTHER PUBLICATIONS

International Search Report and Written Opinion for International Application No. PCT/US2014/069824, ISA/EPO, Date of Mailing Jan. 30, 2015, 8 pages.

(Continued)

*Primary Examiner* — Guerrier Merant
(74) *Attorney, Agent, or Firm* — Toler Law Group, PC

(57) ABSTRACT

A method includes storing, at a counter, a first value indicating a count of read operations in which a bit error is detected in data associated with a first address. The method further includes, in response to the first value exceeding a first threshold value, remapping the first address to a second address using a controller that is coupled to a memory array. The first address corresponds to a first element of the memory array. The second address corresponds to a second element that is included at a memory within the controller. Remapping the first address includes, in response to receiving a first read request for data located at the first address, replacing a first value read from the first element with a second value read from the second element.

30 Claims, 7 Drawing Sheets

(56) References Cited

U.S. PATENT DOCUMENTS

| | | | |
|---|---|---|---|
| 7,721,140 | B2 | 5/2010 | Dell et al. |
| 7,885,128 | B2 | 2/2011 | Fujiwara |
| 8,195,978 | B2 | 6/2012 | Flynn et al. |
| 8,289,790 | B2 | 10/2012 | Rooney et al. |
| 8,413,007 | B2 | 4/2013 | Pawlowski et al. |
| 8,418,026 | B2 | 4/2013 | D'Abreu et al. |
| 8,423,839 | B2 | 4/2013 | Yoel et al. |
| 2003/0070054 | A1 | 4/2003 | Williams et al. |
| 2004/0163015 | A1 | 8/2004 | Nadeau-Dostie et al. |
| 2005/0120265 | A1* | 6/2005 | Pline .................. G06F 11/1008 714/6.32 |
| 2008/0270826 | A1* | 10/2008 | Shaw .................. G06F 11/1666 714/6.12 |
| 2008/0301529 | A1 | 12/2008 | Spanel et al. |
| 2010/0058144 | A1 | 3/2010 | Rohleder et al. |
| 2010/0287446 | A1 | 11/2010 | Post et al. |
| 2011/0041016 | A1 | 2/2011 | O'Connell |
| 2011/0072332 | A1 | 3/2011 | Tomlin |
| 2012/0072786 | A1 | 3/2012 | Bahali et al. |
| 2012/0195144 | A1 | 8/2012 | Ide et al. |
| 2012/0324299 | A1 | 12/2012 | Moshayedi |
| 2013/0010557 | A1 | 1/2013 | Rooney et al. |
| 2013/0024744 | A1 | 1/2013 | Takizawa |
| 2013/0117631 | A1 | 5/2013 | Gruner et al. |
| 2013/0179724 | A1 | 7/2013 | Cordero et al. |
| 2013/0191703 | A1 | 7/2013 | Meaney et al. |
| 2013/0275836 | A1 | 10/2013 | Inada et al. |
| 2014/0376320 | A1* | 12/2014 | Loh .................. G11C 29/76 365/200 |

OTHER PUBLICATIONS

Co-pending U.S. Appl. No. 14/088,867 filed on Nov. 25, 2013, 39 pages.

Tanzawa, T. et al., "A Compact On-Chip ECC for Low Cost Flash Memories," IEEE Journal of Solid-State Circuits, May 1997, vol. 32 (5), pp. 662-669.

Yoon, D.H. et al., "Flexible Cache Error Protection using an ECC FIFO," Proceedings of SC'09, Nov. 11-20, 2009, pp. 1-12.

* cited by examiner

BIT REMAPPING SYSTEM

I. FIELD

The present disclosure is generally related to a bit remapping system.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

As semiconductor processes scale, semiconductor devices may become less reliable and more prone to hardware errors, such as due to defective or "failed" components. To compensate for hardware errors, a memory device (e.g., a dynamic random access memory (DRAM) device) may include a memory array and "extra" or redundant rows of memory cells that can be accessed when other memory cells of the memory array exhibit "hard" errors (e.g., recurring errors) or are determined to have physically failed (e.g., due to a particular process variation or another physical failure). To illustrate, if faulty memory cells are detected in a row x of the memory array during production or testing of the memory device, the row x can be remapped to a redundant row a of the memory array (e.g., by setting an electronic fuse to reroute requests received at the memory device from row x to the redundant row a). As another example, if faulty memory cells in a row y of the memory array are detected "in the field" (e.g., during operation of the memory device), then the row y may be remapped to a redundant row b of the memory array. However, redundant rows may consume a large area of the memory device, which may be costly or infeasible in certain applications.

III. SUMMARY

This disclosure presents embodiments of a bit remapping system. The bit remapping system may include a controller coupled to a memory array. The controller includes a counter and a remapping device. The counter may store a value indicating a count of read operations in which a bit error is detected in data associated with an address of the memory array. The bit errors may correspond to correctable (e.g., single-bit-error) memory errors, to uncorrectable (e.g., multi-bit-error) memory errors, or to both. The remapping device may remap the address of the memory array to an address located at a memory within the controller in response to the value exceeding a threshold value. Remapping may include, in response to receiving a read request for data located at the address of the memory array, replacing a value read from the memory array with a value read from the memory. An electronic device including the bit remapping system may use less redundant memory (e.g., a single memory cell or a block of memory cells) to correct a memory error than a device that uses a redundant row (or column) at the memory array. The electronic device may further use the bit remapping system to correct a memory error when the memory array does not contain redundant rows (or columns).

In a particular embodiment, a method includes storing, at a counter, a first value indicating a count of read operations in which a bit error is detected in data associated with a first address. The method further includes, in response to the first value exceeding a first threshold value, remapping the first address to a second address using a controller that is coupled to a memory array. The first address corresponds to a first element of the memory array. The second address corresponds to a second element that is included at a memory within the controller. Remapping the first address includes, in response to receiving a first read request for data located at the first address, replacing a first value read from the first element with a second value read from the second element to generate modified data.

In another particular embodiment, an apparatus includes a controller configured to be coupled to a memory array. The controller includes a counter configured to store a value indicating a count of read operations in which a bit error is detected in data associated with a first address. The first address corresponds to a first element of the memory array. The controller further includes a remapping device configured to, in response to the value at the counter exceeding a first threshold value, remap the first address to a second address. The second address corresponds to a second element that is included at a memory within the controller. In response to receiving a read request for data located at the first address, the remapping device is configured to cause a first bit value read from the first element to be replaced with a second bit value read from the second element to generate modified data.

In another particular embodiment, an apparatus includes control means configured to be coupled to a memory array. The control means includes means for storing a value indicating a count of read operations in which a bit error is detected in data associated with a first address. The first address corresponds to a first element of the memory array. The control means further includes means for remapping the first address to a second address in response to the value at the means for storing exceeding a threshold value, where the second address corresponds to a second element that is included at a means for storing data within the control means, and for causing a first value read from the first element to be replaced with a second value read from the second element to generate modified data in response to receiving a read request for data located at the first address.

In another particular embodiment, a non-transitory computer readable medium stores instructions that, when executed by a processor, cause the processor to store, at a counter, a value indicating a count of read operations in which a bit error is detected in data associated with a first address. The non-transitory computer readable medium further stores instructions that, when executed by the processor, cause the processor to, in response to the first value exceeding a first threshold value, remap the first address to a second address using a controller that is coupled to a memory array. The first address corresponds to a first element of the memory array. The second address corresponds to a second element that is included at a memory within the controller. Remapping the first address includes, in response to receiving a read request for data located at the first address, replacing a first value read from the first element with a second value read from the second element to generate modified data.

One particular advantage provided by at least one of the disclosed embodiments is that an electronic device including the bit remapping system may use less redundant memory (e.g., a single memory cell or a block of memory cells) to correct a memory error than a device that uses a redundant row at a memory array. The electronic device may further use the bit remapping system to correct a memory error when the memory array does not contain redundant rows.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
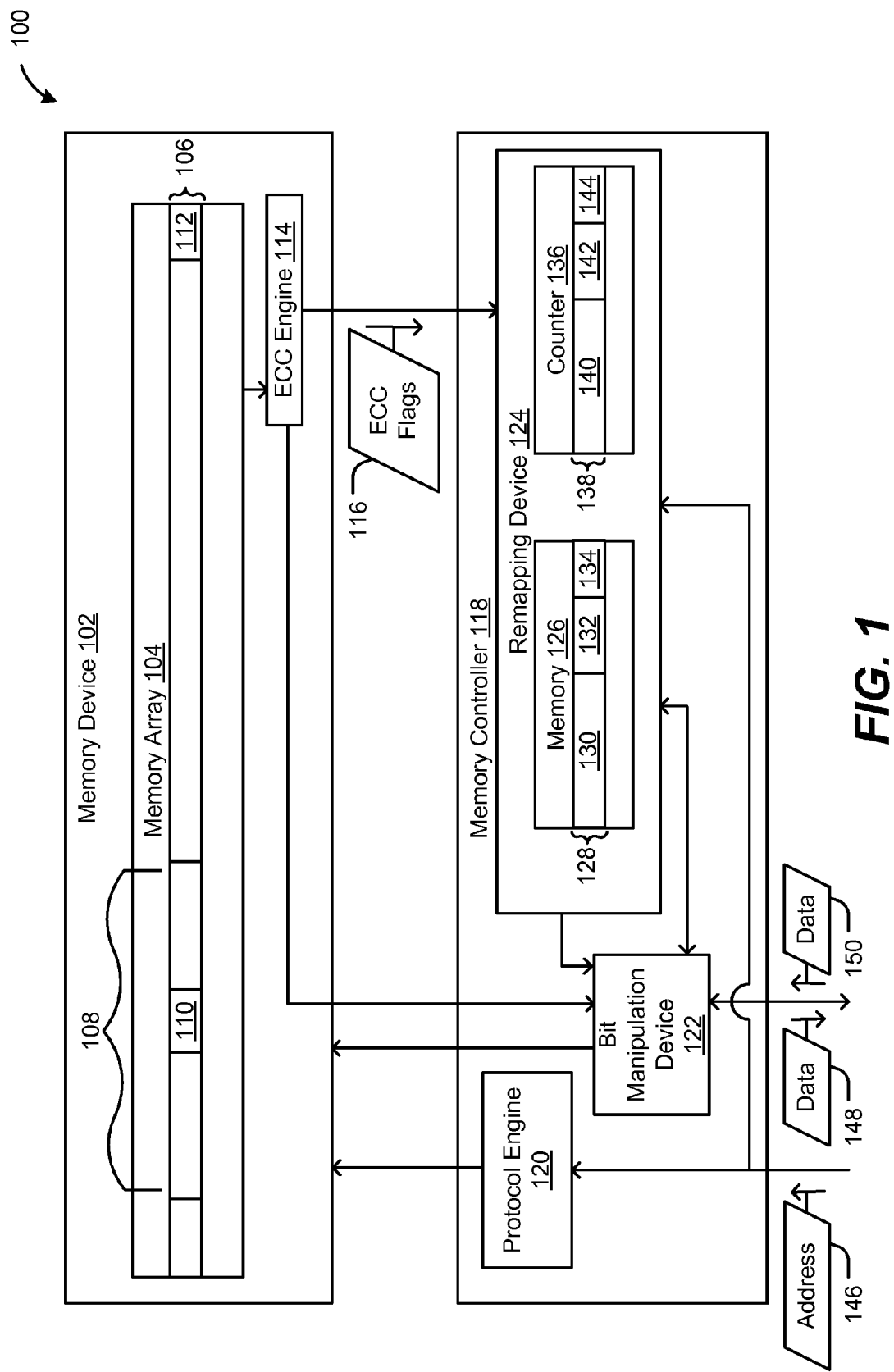
FIG. 1 is a diagram depicting a first particular embodiment of a bit remapping system.

FIG. 1 illustrates a particular embodiment of a bit remapping system 100 that includes a memory controller 118 coupled to a memory device 102. The memory device 102 includes a memory array 104 (e.g., a dynamic random access memory (DRAM) device) and an error correcting code (ECC) engine 114 (e.g., an in-memory ECC engine). The memory controller 118 may include a protocol engine 120, a bit manipulation device 122 (e.g., including a merger unit and/or a splitter unit), and a remapping device 124. The remapping device 124 includes a memory 126 (e.g., a static random access memory (SRAM) device) and a counter 136. The memory 126 and the counter 136 may be part of a single device or may be separate devices.

The memory controller 118 may store, at the counter 136, data indicating a count of read operations in which a bit error is detected in data associated with a particular address of the memory array 104. The counter 136 may include multiple counters to enable tracking of multiple addresses having associated bit errors. The bit errors may correspond to correctable bit errors (e.g., one-bit errors which can be identified and corrected by the ECC engine 114 using corresponding ECC data). When a particular count of read operations exceeds a threshold value, the memory controller 118 is configured to remap data for one or more particular memory cells corresponding to the address associated with the bit errors to the memory 126. The bit manipulation device 122 may be configured to combine data from the memory 126 (e.g., remapped data) with corresponding data received from the memory device 102 to generate modified data in response to a read request from a host device (e.g., an external processor). The modified data may correspond to output data 148 provided to the host device. The bit manipulation device 122 may be further configured to extract data to be written to the memory 126 in response to a write request from the host device. For example, the bit manipulation device 122 may transmit a bit to be written to the memory 126 from data received as part of a write request from the host device. Further, the bit manipulation device 122 may transmit the data received as part of the write request to the memory device 102. The remapped data at the memory 126 (e.g., a memory address, a bit offset, and a bit value, as described below) may occupy less space (e.g., 135 bits) than a redundant row of memory at the memory array 104 (e.g., 256 bits). Further, the remapped data may be used to repair bit errors at the memory array 104 when the memory array 104 does not include redundant rows.

During operation, in response to a read request from the host device, the memory controller 118 may receive an address 146 corresponding to requested data to be read from the memory array 104. In a particular embodiment, the address 146 is provided to the remapping device 124 and to the protocol engine 120 in parallel. In another particular embodiment, the address 146 is provided to the remapping device 124 and the protocol engine 120 sequentially.

When the address 146 is provided to the remapping device 124, the remapping device 124 determines whether the address 146 corresponds to data stored at the memory 126. For example, the address 146 may correspond to a row 128. The row 128 may include data identifying a memory address 130 (e.g., a physical address corresponding to the address 146), a bit offset 132 (e.g., an offset from the memory address 130 corresponding to an identified bit error), and a data block 134 (e.g., a memory block that stores a data value). When the row 128 is identified as corresponding to the address 146, a signal may be transmitted from the memory 126 to the bit manipulation device 122. The signal may indicate a value read from the data block 134 and the bit offset 132. When the address 146 does not correspond to any data stored at the memory 126, a signal may be transmitted to the bit manipulation device 122 indicating that the address 146 does not correspond to data stored at the memory 126.

The protocol engine 120 may provide the address 146 to the memory device 102 to be used in accessing the memory array 104. In a particular embodiment, a data entry 108 of a row 106 corresponds to the address 146. A data value corresponding to the data entry 108 may be retrieved from the memory device 102 and transmitted (e.g., after being checked by the ECC engine 114, as described below) to the memory controller 118 (e.g., to the bit manipulation device 122). The data value corresponding to the data entry 108 may include a correctable bit error (e.g., corresponding to data retrieved from the memory cell 110). When the address 146 corresponds to data stored at the memory 126 (e.g., if the address 146 corresponds to the row 128), a bit value corresponding to the data block 134 may be merged with the data value of the data entry 108 at a location indicated by the bit offset 132. For example, a bit value corresponding to the data entry 108 at the location indicated by the bit offset 132, identifying a location corresponding to a location of the memory cell 110 within the data entry 108 (e.g., the sixth bit of the data entry 108), may be replaced by the bit value corresponding to the data block 134 (e.g., using a merger unit at the bit manipulation device 122) to generate modified data. The modified data may be transmitted to the host device as the output data 148 from the memory controller 118. When the address 146 does not correspond to data stored at the memory 126, the data value of the data entry 108 is transmitted to the host device as the output data 148 from the memory controller 118.

In response to the read request, the data value of the data entry 108 may be transmitted from the memory array 104 to the ECC engine 114, along with data corresponding to an ECC block 112. The ECC engine 114 may determine whether the data corresponding to the data entry 108 and the data corresponding to the ECC block 112 indicate one or more correctable bit errors. For example, the ECC engine 114 may determine that a correctable bit error has occurred at the memory cell 110 of the data entry 108. When the ECC engine 114 determines that a correctable bit error has occurred at the memory cell 110, the ECC engine 114 may transmit ECC flags 116 to the remapping device 124. The ECC flags 116 may indicate that a correctable bit error occurred and may indicate the address of the correctable bit error. In a particular embodiment, the ECC flags 116 include a corrected data value corresponding to the correctable bit error. The ECC engine 114 may transmit the corrected data value to the memory controller 118.

When the ECC flags 116 do not correspond to a row of the counter 136, a new row at the counter 136 may be created. The new row may correspond to a bit location of the detected correctable bit error. For example, the new row may correspond to the memory cell 110. When the ECC flags 116 correspond to a row of the counter 136, a corresponding read operation error count value at the counter 136 may be incremented. For example, the ECC flags 116 may correspond to the row 138, which includes a counter address 140 (e.g., corresponding to the address 146), a bit offset 142, and a read operation error count value 144. In this example, the read operation error count value 144 may be incremented in response to receiving the ECC flags 116. In response to incrementing the read operation error count value 144, the read operation error count value 144 may be compared to a threshold value. When the read operation error count value 144 exceeds the threshold value, the remapping device 124 may create a new data entry (e.g., at the row 128) at the memory 126 corresponding to the memory cell 110. The new data entry may include a memory address 130 field that stores the address 146, a bit offset 132 field that stores an offset corresponding to the correctable bit error, and a data block 134 that stores a corrected value corresponding to the memory address 130 and to the bit offset 132. In a particular embodiment, the data block 134 stores a corrected value generated by the ECC engine 114. In another particular embodiment, the memory controller 118 may request a data value corresponding to the data block 134 from an external memory device and may store a value received from the external memory device at the data block 134. In another particular embodiment, the memory controller 118 may indicate that a value read from the data block 134 is not valid until a write request corresponding to the address 146 is received at the memory controller 118, as described below.

During operation, in response to a write request from the host device, the memory controller 118 may receive data 150 to be written to the memory array 104 and an address 146 corresponding to a requested location to store the data 150 at the memory array 104. In a particular embodiment, the address 146 is provided to the remapping device 124 and to the protocol engine 120 in parallel. In another particular embodiment, the address 146 is provided to the remapping device 124 and the protocol engine 120 sequentially. The data 150 may be forwarded to the bit manipulation device 122. In a particular embodiment, the bit manipulation device 122 provides the data 150 to the remapping device 124 and to the protocol engine 120 in parallel. In another particular embodiment, the bit manipulation device 122 provides the data 150 to the remapping device 124 and to the protocol engine 120 sequentially.

When the address 146 is provided to the remapping device 124, the remapping device 124 determines whether the address 146 corresponds to data stored at the memory 126. For example, the address 146 may correspond to the row 128 if the address 146 matches the memory address 130. When the row 128 corresponding to the address 146 is identified at the memory 126, a signal may be transmitted from the memory 126 to the bit manipulation device 122, requesting a portion of the data 150 (e.g., data corresponding to the bit offset 132) to be stored at the data block 134. The bit manipulation device 122 (e.g., using a splitter unit) may be configured to transmit the portion of the data 150 to the remapping device 124. For example, the bit manipulation device 122 may extract a portion of the data 150 corresponding to the memory address 130 and to the bit offset 132 and transmit the portion of the data 150 to the remapping device 124. The remapping device 124 may store the portion of the data 150 at a data block (e.g., the data block 134) of a corresponding row (e.g., the row 128) of the memory 126.

When the address 146 is provided to the protocol engine 120, the protocol engine 120 may forward the address 146 to the memory device 102. The memory controller 118 (e.g., the splitter unit of the bit manipulation device 122) may forward the data 150 (e.g., including any portion of the data 150 transmitted to the remapping device 124) to the memory device 102. The memory device 102 may provide the address 146 and the data 150 to the memory array 104. In a particular embodiment, a data entry 108 of the row 106 corresponds to the address 146 and to the data 150. A data portion of the data 150 may be stored at the data entry 108. In an embodiment where the data 150 includes ECC data (e.g., parity bits), the ECC portion of the data 150 may be stored at an ECC block 112. In another embodiment where the data 150 does not include an ECC portion, the ECC engine 114 may generate an ECC portion that corresponds to the data 150 and the generated ECC portion is stored at the ECC block 112.

An electronic device including the bit remapping system 100 may use less redundant memory (e.g., a single memory cell) to correct a correctable bit error, as compared to using a redundant row at a memory array. The electronic device may further use the bit remapping system 100 to correct memory errors when the memory array does not contain redundant rows.

Figure 2:
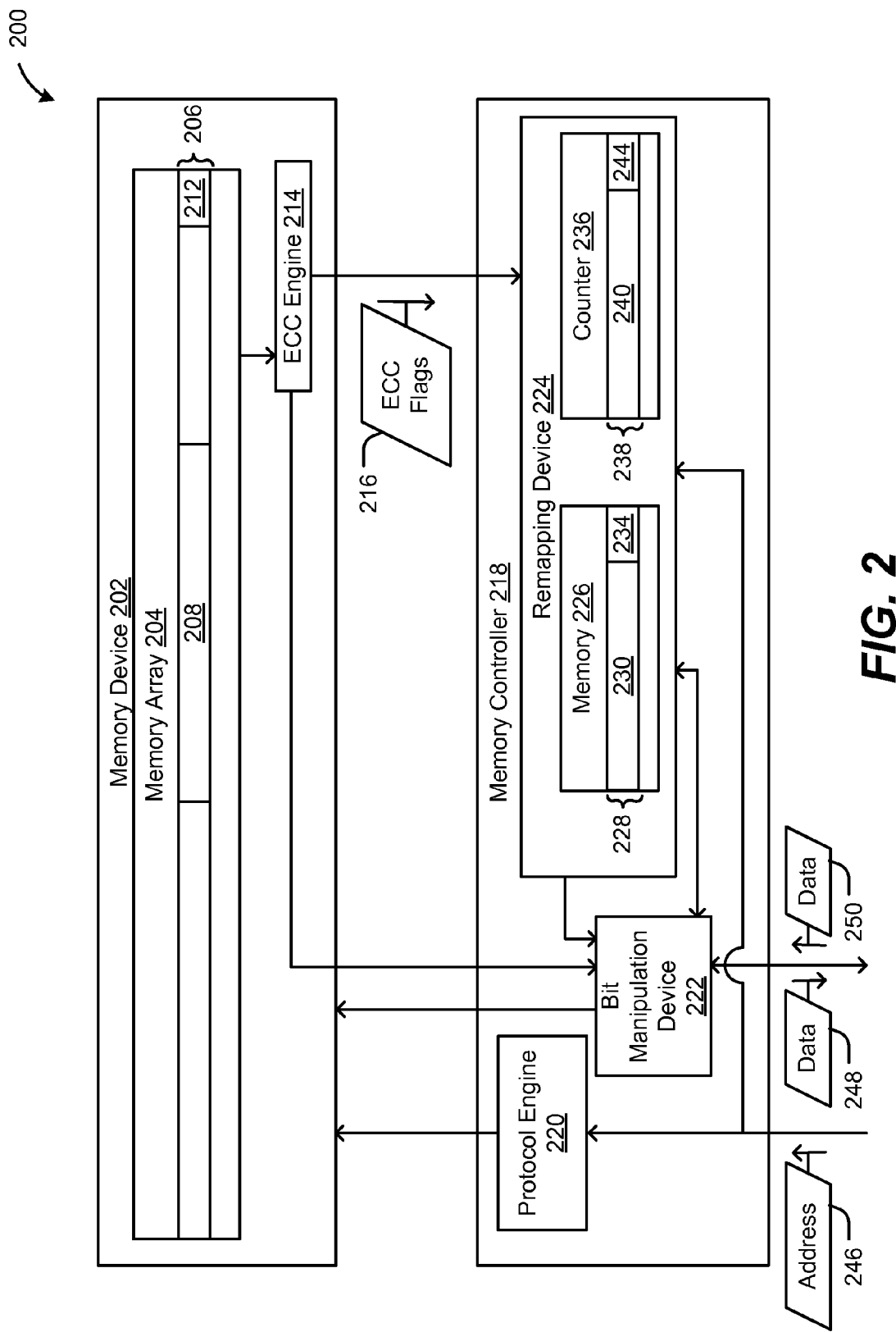
FIG. 2 is a diagram depicting a second particular embodiment of a bit remapping system.

FIG. 2 illustrates a particular embodiment of a bit remapping system 200 that includes a memory controller 218 coupled to a memory device 202. The memory controller 218 may correspond to the memory controller 118 of FIG. 1 and the memory device 202 may correspond to the memory device 202 of FIG. 1. The bit remapping system 200 may operate similarly to the bit remapping system 100 of FIG. 1. However, the counter 236 may count instances of read operations that include uncorrectable bit errors (e.g., multi-bit errors which cannot be located within the data entry 208 by the ECC engine 214) rather than counting instances of errors of a particular bit (e.g., identified by the counter address 140 and the bit offset 142 of FIG. 1).

The memory 226 may store a block (i.e., multiple bits) of data (e.g., rather than an offset and a bit value, as in FIG. 1) corresponding to the address 246 when a count of read operations corresponding to the address 246 that result in an uncorrectable bit error being detected in data corresponding to the address 246 exceeds a threshold. When the memory controller 218 receives a read request including an address 246 that corresponds to data stored at the memory 226, the bit manipulation device 222 replaces (e.g., using one or more multiplexers) data received from the memory device 202 with data from the memory 226 (rather than merging data received from the memory device 102 with data from the memory 126, as in FIG. 1).

In a particular embodiment, the remapping device 224 may be used in conjunction with the remapping device 124 of FIG. 1 (e.g., by counting read operations where correctable bit errors and/or uncorrectable bit errors are detected and by remapping data locations corresponding to addresses when the number of read operations where bit errors are detected exceeds a threshold). The threshold may be the same for correctable bit errors and uncorrectable bit errors or different thresholds may be used. Read operations corresponding to correctable bit errors at an address may be counted together with read operations corresponding to uncorrectable bit errors, or read operations with correctable bit errors may be counted separately from read operations corresponding to uncorrectable bit errors.

Figure 3:
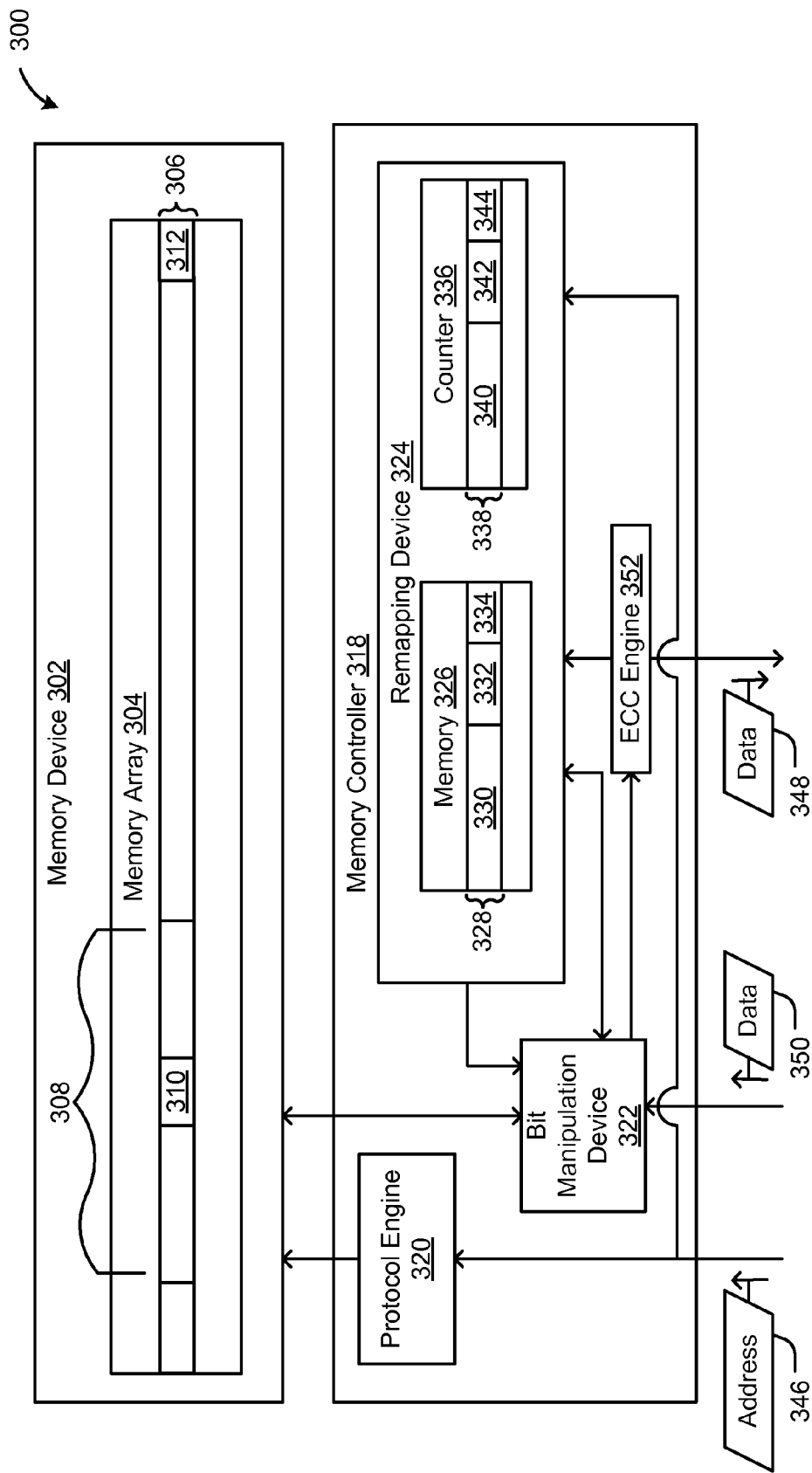
FIG. 3 is a diagram depicting a third particular embodiment of a bit remapping system.

FIG. 3 illustrates a particular embodiment of a bit remapping system 300 that includes a memory controller 318 coupled to a memory device 302 that includes a memory array 304 (e.g., a dynamic random access memory (DRAM) device). The memory controller 318 and the memory device 302 may correspond to the memory controller 118 and the memory device 102 of FIG. 1 and may operate in a substantially similar manner as described with respect to FIG. 1. As compared to the ECC engine 114 in the memory device 102 of FIG. 1, the system 300 includes an ECC engine 352 in the memory controller 318.

The ECC engine 352 is configured to generate ECC data to be stored in the ECC data location 312 at the memory array 304 in conjunction with storing data 350 corresponding to an address 346 at a row 306 of the memory array 304. The ECC engine 352 is also configured to perform an ECC decode operation on data and ECC data read from the row 306 of the memory array 304 in response to a read instruction.

If data read from the memory array 304 corresponds to an address included in the memory 326 (e.g., matches the memory address 330), the bit manipulation device 322 may modify the read data by merging the read data with the bit value 334 identified by the offset 332, and the modified data may be provided to the ECC engine 352. As a result, data that contains recurring bit errors (e.g., hard errors) may be corrected prior to decoding by the ECC engine 352, increasing an effective error correction capability of the ECC engine 352. For example, if data read from the memory array 304 includes a hard error tracked in the memory 326 and a soft error that is not tracked in the memory 326, after the bit manipulation device 322 corrects the hard error, the ECC engine 352 can correct the soft error that remains in the data. The ECC engine 352 may provide ECC flags to the remapping device 324 to indicate detected bit errors, such as described with respect to the ECC flags 116 of FIG. 1. The ECC flags may be used as an indicator to add entries in the counter 336 and to update counts associated with the entries (e.g., to increment the count value 344 associated with the counter address 340 and the offset 342 in response to detecting another occurrence of a bit error tracked by the row 338 of the counter 336).

Figure 4:
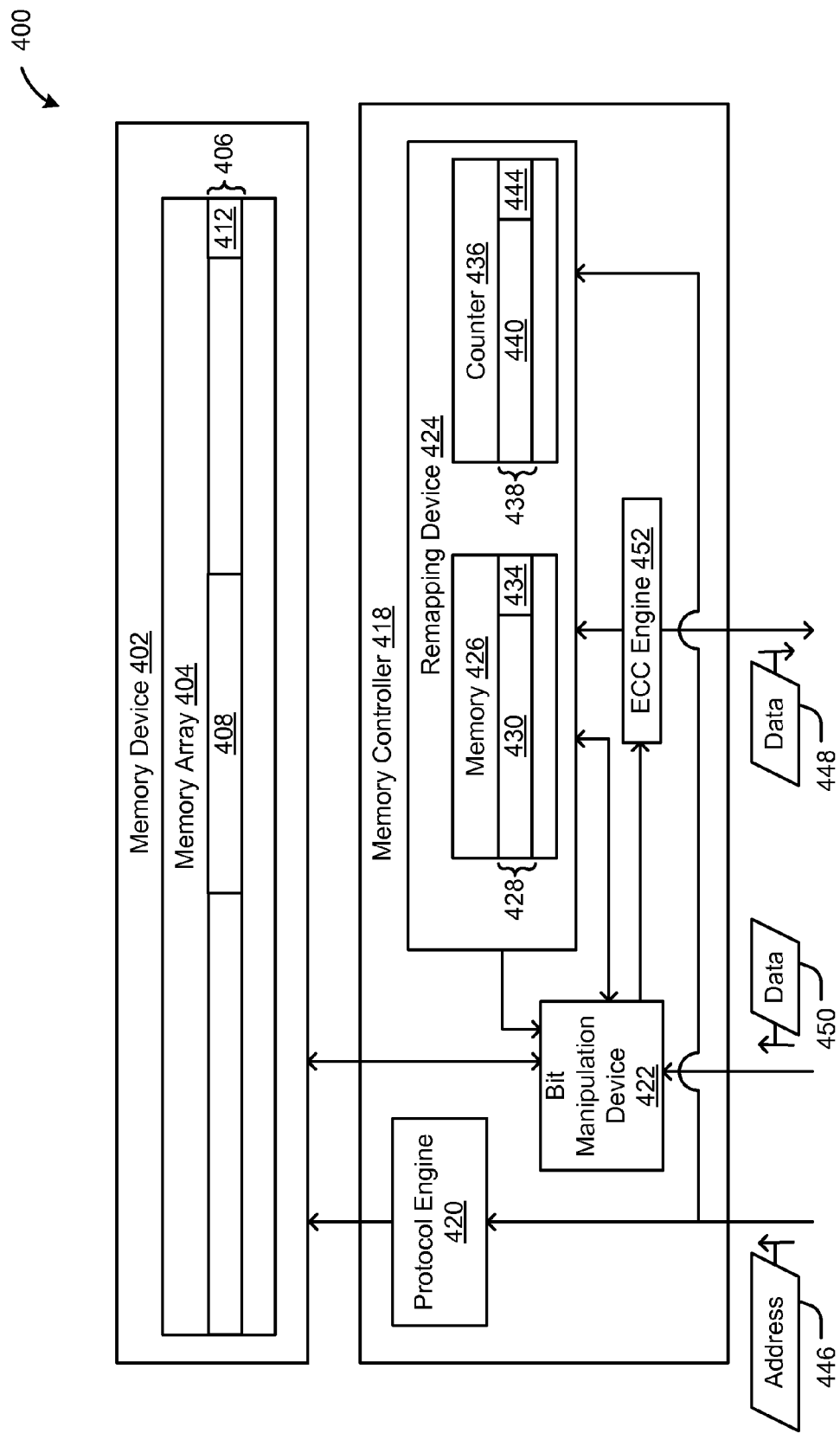
FIG. 4 is a diagram depicting a fourth particular embodiment of a bit remapping system.

FIG. 4 illustrates a particular embodiment of a bit remapping system 400 that includes a memory controller 418 with a bit manipulation device 422 that is coupled to a memory device 402 that includes a memory array 404 (e.g., a dynamic random access memory (DRAM) device). The memory controller 418 and the memory device 402 may correspond to the memory controller 218 and the memory device 202 of FIG. 2 and may operate in a substantially similar manner as described with respect to FIG. 2. As compared to the ECC engine 214 in the memory device 202 of FIG. 2, the system 400 includes an ECC engine 452 in the memory controller 418.

The ECC engine 452 is configured to generate ECC data to be stored in the ECC data location 412 at the memory array 404 in conjunction with storing data 450 corresponding to an address 446 at a row 406 of the memory array 404. The ECC engine 452 is also configured to perform an ECC decode operation on data and ECC data read from the row 406 of the memory array 404 in response to a read instruction.

If data read from the memory array 404 corresponds to an address included in the memory 426 (e.g., matches the memory address 430), the bit manipulation device 422 may modify the read data by replacing a portion (e.g., the portion 408) or all of the read data with a value retrieved from the data block 434. The updated read data may be provided to the ECC engine 452. As a result, data that contains recurring multi-bit errors (e.g., multiple hard errors) may be corrected prior to decoding by the ECC engine 452. The ECC engine 452 may provide ECC flags to the remapping device 424 to indicate detected bit errors, such as described with respect to the ECC flags 116 of FIG. 1. The ECC flags may be used as an indicator to add entries in the counter 446 and to update counts associated with the entries (e.g., to increment the count value 444 associated with the counter address 440 and the offset 442 in response to detecting another occurrence of bit errors tracked by the row 448 of the counter 446).

Figure 5:
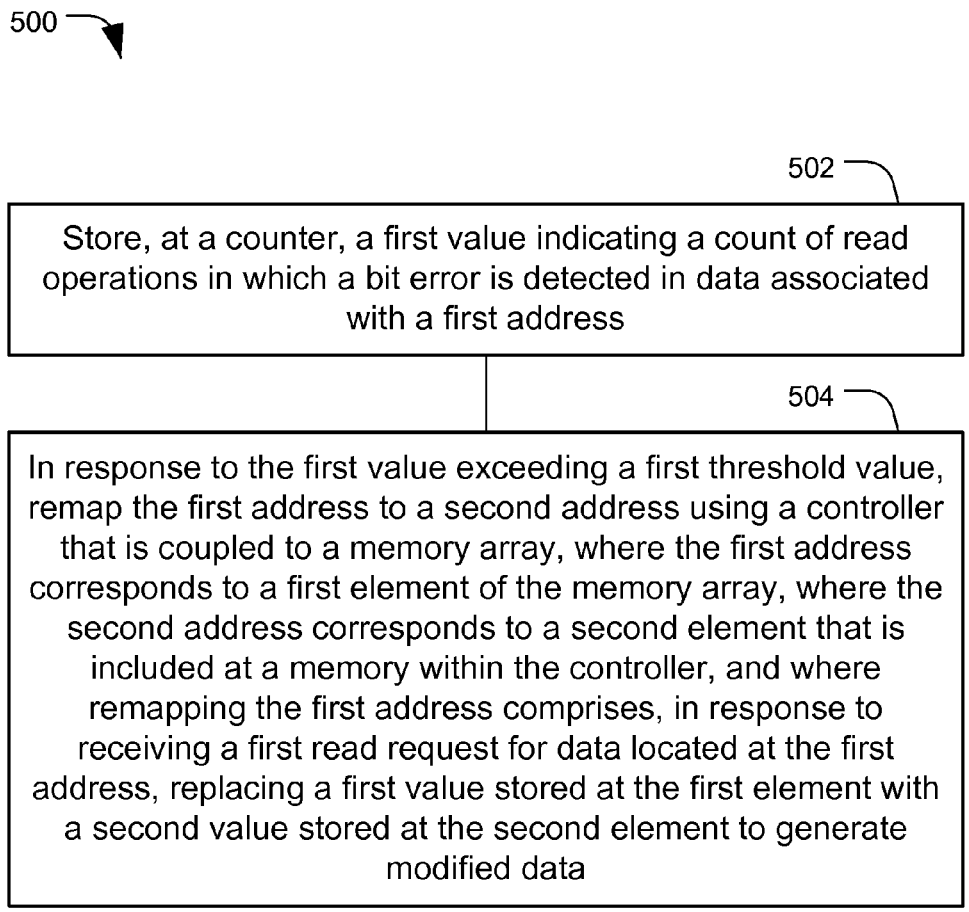
FIG. 5 is a flow chart that illustrates a method of remapping a bit.

FIG. 5 is a flowchart illustrating a particular embodiment of a method 500 of remapping a bit. The method includes, at 502, storing, at a counter, a first value indicating a count of read operations in which an error is detected in data associated with a first address. For example, the remapping device 124 of FIG. 1 may store, at the read operation error count value 144 of the counter 136, a value indicating a count of read operations where a correctable bit error is detected in data associated with the address 146. As another example, the remapping device 324 of FIG. 3 may store, at the uncorrectable bit error count value 344 of the counter 336, a value indicating a count of read operations where a bit error is detected in data associated with the address 346.

The method also includes, at 504, in response to the first value exceeding a first threshold value, remapping the first address to a second address using a controller that is coupled to a memory array. The first address corresponds to a first element (e.g., a cell or a block) of the memory array. The second address corresponds to a second element that is included at a memory within the controller. Remapping the first address includes, in response to receiving a first read request for data located at the first address, replacing a first value (e.g., a bit value or a block value) read from the first element with a second value read from the second element to generate modified data. For example, in response to the value at the read operation error count value 144 of FIG. 1 exceeding a threshold value, the memory controller 118 that is coupled to the memory device 102 may remap the memory cell 110 to the row 128 of the memory 126. Remapping may include, in response to receiving a read request for data located at the data entry 108, replacing the data read from the memory cell 110 with the data read from the data block 134 of the memory 126 to generate modified data. As another example, in response to the value at the data entry 444 of FIG. 4 exceeding a threshold value, the memory controller 418 that is coupled to the memory device 402 may remap the data entry 408 to the row 428 of the memory 426. Remapping may include, in response to receiving a read request for data located at the data entry 408, replacing the data read from the data entry 408 with the data read from the data block 434 of the memory 426 to generate modified data.

The method 500 of FIG. 5 may be initiated and/or performed by a processing unit such as a central processing unit (CPU), a field-programmable gate array (FPGA) device, an application-specific integrated circuit (ASIC), a controller, another hardware device, firmware device, or any combination thereof. As an example, the method 500 of FIG. 5 can be performed by one or more processors that execute instructions, as further described with reference to FIG. 6.

An electronic device operating according to the method 500 may use less redundant memory (e.g., a block of memory cells) to correct a bit error (e.g., a correctable bit error and/or an uncorrectable bit error), as compared to using a redundant row at a memory array. The electronic device may further use the method 500 to correct the memory error when the memory array does not contain redundant rows.

Figure 6:
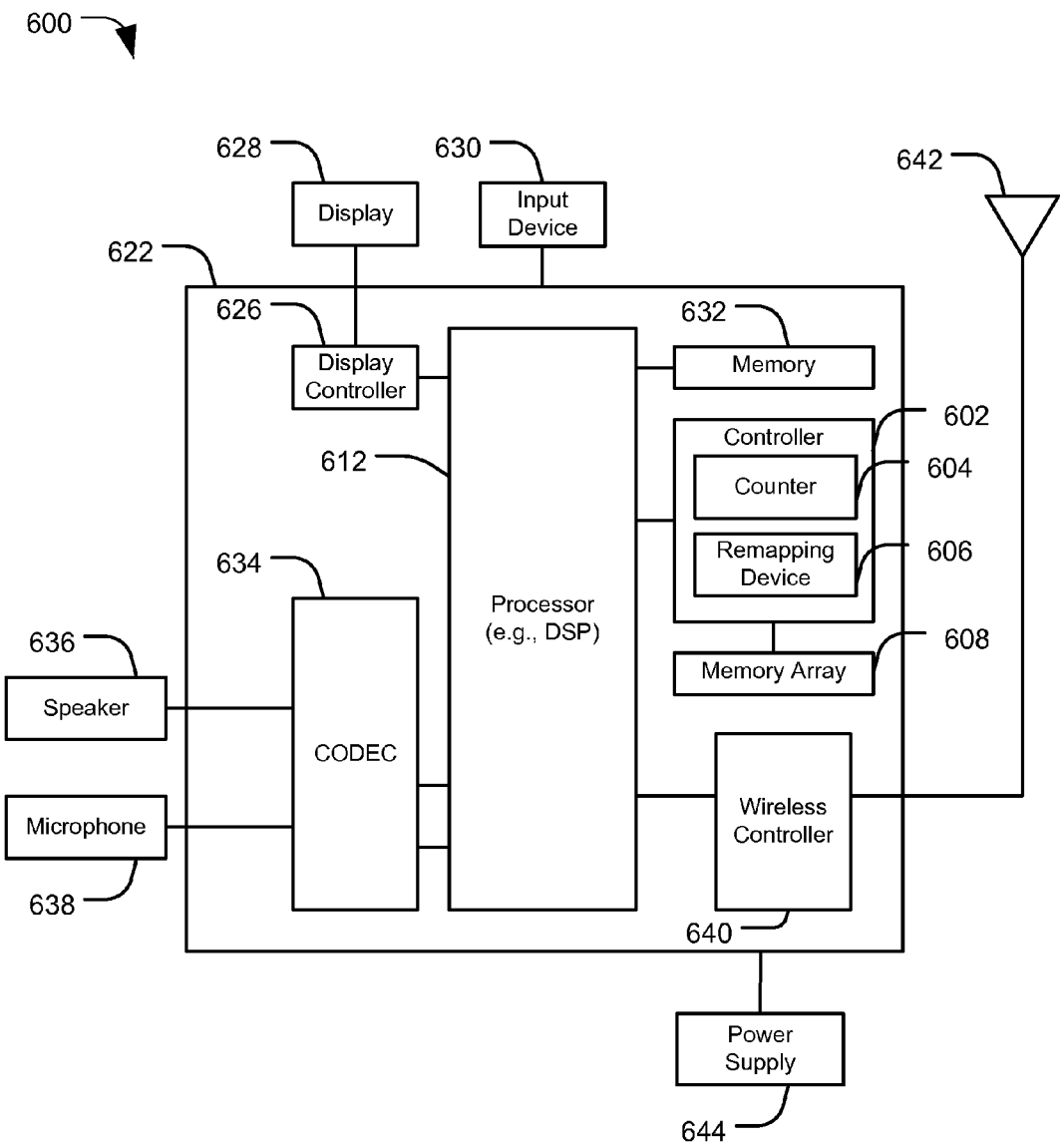
FIG. 6 is a block diagram that illustrates a communication device including a bit remapping system.

Referring to FIG. 6, a block diagram depicts a particular illustrative embodiment of a mobile device 600 that includes a controller 602 that includes a counter 604 and a remapping device 606, and a memory array 608. The mobile device 600, or components thereof, may include, implement, or be included within a device such as a communications device, a mobile phone, a cellular phone, a computer, a portable computer, a tablet, an access point, a set top box, an entertainment unit, a navigation device, a personal digital assistant (PDA), a fixed location data unit, a mobile location data unit, a desktop computer, a monitor, a computer monitor, a television, a tuner, a radio, a satellite radio, a music player, a digital music player, a portable music player, a video player, a digital video player, a digital video disc (DVD) player, or a portable digital video player.

The mobile device 600 may include a processor 612, such as a digital signal processor (DSP). The processor 612 may be coupled to a memory 632 (e.g., a non-transitory computer-readable medium). The memory 632 may include the memory array 608 or may be distinct from the memory array 608. The processor 612 may be further coupled to the controller 602. The controller 602 may include the counter 604 and the remapping device 606. The memory array 608 may be configured to store a data value and error-correcting code (ECC) data associated with the data value. The memory array 608 may be part of a memory device that includes an ECC engine, as described above with reference to FIGS. 1 and 3. The controller 606 may include an ECC engine, as described above with reference to FIGS. 2 and 4. The counter 604 may be configured to store a value indicating a number of detected bit errors associated with one or more memory cells of the memory array 608. The remapping device 606 may be configured to, in response to the value at the counter 604 exceeding a threshold, remap an address corresponding to the one or more memory cells to a memory within the controller 602. The remapping device 606 and the counter 604 may be part of a single device or may be separate devices. For example, the controller 602 may correspond to the memory controller 118 of FIG. 1, the memory controller 218 of FIG. 2, the memory controller 318 of FIG. 3, or the memory controller 418 of FIG. 4. The counter 604 may correspond to the counter 136 of FIG. 1, the counter 236 of FIG. 2, the counter 336 of FIG. 3, or the counter 436 of FIG. 4. The remapping device 606 may correspond to the remapping device 124 of FIG. 1, the remapping device 224 of FIG. 2, the remapping device 324 of FIG. 3, or the remapping device 424 of FIG. 4. The memory array 608 may correspond to the memory array 104 of FIG. 1, the memory array 204 of FIG. 2, the memory array 304 of FIG. 3, or the memory array 404 of FIG. 4.

FIG. 6 also shows a display controller 626 that is coupled to the processor 612 and to a display 628. A coder/decoder (CODEC) 634 can also be coupled to the processor 612. A speaker 636 and a microphone 638 can be coupled to the CODEC 634. A wireless controller 640 can be coupled to the processor 612 and can be further coupled to an antenna 642.

In a particular embodiment, the processor 612, the display controller 626, the memory 632, the CODEC 634, the wireless controller 640, the controller 602, and memory array 608 are included in a system-in-package or system-on-chip device 622. An input device 630 and a power supply 644 may be coupled to the system-on-chip device 622. Moreover, in a particular embodiment, and as illustrated in FIG. 6, the display 628, the input device 630, the speaker 636, the microphone 638, the antenna 642, and the power supply 644 are external to the system-on-chip device 622. However, each of the display 628, the input device 630, the speaker 636, the microphone 638, the antenna 642, and the power supply 644 can be coupled to a component of the system-on-chip device 622, such as an interface or a controller. The controller 602 and/or the memory array 608 may be included in the system-on-chip device 622, as shown in FIG. 6, or may be included in one or more separate components.

In conjunction with the described embodiments, an apparatus (such as the mobile device 600) may include control means (e.g., the memory controller 118 of FIG. 1, the memory controller 218 of FIG. 2, the memory controller 318 of FIG. 3, the memory controller 418 of FIG. 4, or the controller 602 of FIG. 6) configured to be coupled to a memory array (e.g., the memory array 104 of FIG. 1, the memory array 204 of FIG. 2, the memory array 304 of FIG. 3, the memory array 404 of FIG. 4, or the memory array 608 of FIG. 6). The control means may include means (e.g., the counter 136 of FIG. 1, the counter 236 of FIG. 2, the counter 336 of FIG. 3, the counter 436 of FIG. 4, or the counter 604 of FIG. 6) for storing a value indicating a count of read operations where a bit error is detected in data associated with a first address. The first address may correspond to a first cell of the memory array. The control means may further include means (e.g., the remapping device 124 of FIG. 1, the remapping device 224 of FIG. 2, the remapping device 324 of FIG. 3, the remapping device 424 of FIG. 4, or the remapping device 606 of FIG. 6) for remapping the first address to the second address in response to the value at the means for storing exceeding a threshold value, where the second address may correspond to a second cell that is included at a means for storing data (e.g., the memory 126 of FIG. 1, the memory 226 of FIG. 2, the memory 326 of FIG. 3, or the memory 426 of FIG. 4) within the control means, and for causing a first bit value read from the first cell to be replaced with a second bit value read from a second cell to generate modified data in response to receiving a read request for data located at the first address.

Figure 7:
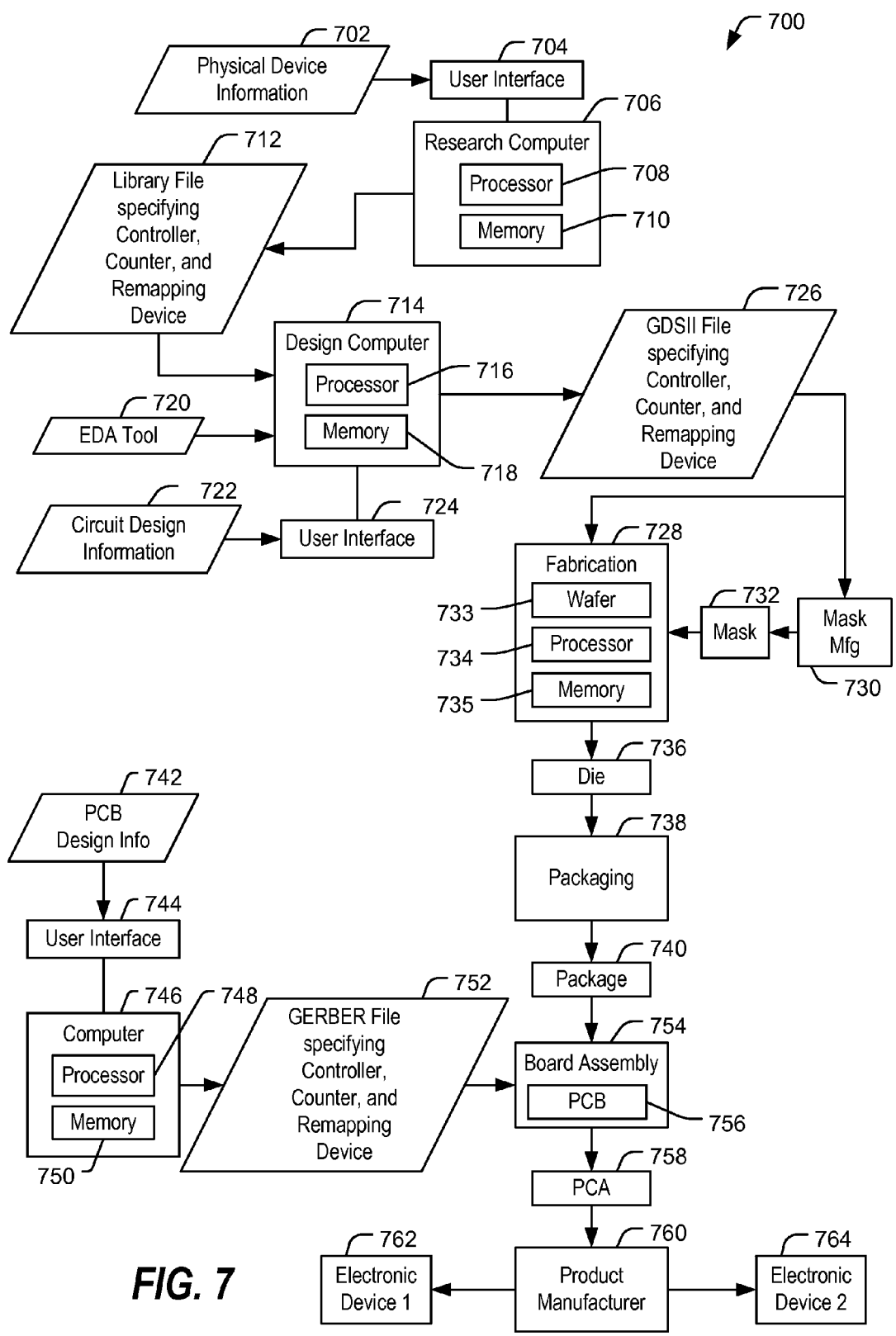
FIG. 7 is a data flow diagram that illustrates a particular illustrative embodiment of a manufacturing process to manufacture electronic devices that include a bit remapping system.

The foregoing disclosed devices and functionalities may be designed and configured into computer files (e.g. RTL, GDSII, GERBER, etc.) stored on computer-readable media. Some or all such files may be provided to fabrication handlers to fabricate devices based on such files. Resulting products include wafers that are then cut into dies and packaged into chips. The chips are then employed in devices described above. FIG. 7 depicts a particular illustrative embodiment of an electronic device manufacturing process 700.

Physical device information 702 is received at the manufacturing process 700, such as at a research computer 706. The physical device information 702 may include design information representing at least one physical property of an electronic device that includes a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6). For example, the physical device information 702 may include physical parameters, material characteristics, and structure information that is entered via a user interface 704 coupled to the research computer 706. The research computer 706 includes a processor 708, such as one or more processing cores, coupled to a computer-readable medium such as a memory 710. The memory 710 may store computer-readable instructions that are executable to cause the processor 708 to transform the physical device information 702 to comply with a file format and to generate a library file 712.

In a particular embodiment, the library file 712 includes at least one data file including the transformed design information. For example, the library file 712 may include a library of electronic devices (e.g., semiconductor devices) that includes a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6), provided for use with an electronic design automation (EDA) tool 720.

The library file 712 may be used in conjunction with the EDA tool 720 at a design computer 714 including a processor 716, such as one or more processing cores, coupled to a memory 718. The EDA tool 720 may be stored as processor executable instructions at the memory 718 to enable a user of the design computer 714 to design a circuit that includes a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6), using the library file 712. For example, a user of the design computer 714 may enter circuit design information 722 via a user interface 724 coupled to the design computer 714. The circuit design information 722 may include design information representing at least one physical property of an electronic device that includes a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6).

To illustrate, the circuit design property may include identification of particular circuits and relationships to other elements in a circuit design, positioning information, feature size information, interconnection information, or other information representing a physical property of an electronic device.

The design computer 714 may be configured to transform the design information, including the circuit design information 722, to comply with a file format. To illustrate, the file formation may include a database binary file format representing planar geometric shapes, text labels, and other information about a circuit layout in a hierarchical format, such as a Graphic Data System (GDSII) file format. The design computer 714 may be configured to generate a data file including the transformed design information, such as a GDSII file 726 that includes information describing a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6), and that also includes additional electronic circuits and components within the SOC.

The GDSII file 726 may be received at a fabrication process 728 to manufacture a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6) according to transformed information in the GDSII file 726. For example, a device manufacture process may include providing the GDSII file 726 to a mask manufacturer 730 to create one or more masks, such as masks to be used with photolithography processing, illustrated in FIG. 7 as a representative mask 732. The mask 732 may be used during the fabrication process to generate one or more wafers 733, which may be tested and separated into dies, such as a representative die 736. The die 736 includes a circuit including a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6).

In a particular embodiment, the fabrication process 728 may be initiated by or controlled by a processor 734. The processor 734 may access a memory 735 that includes executable instructions such as computer-readable instructions or processor-readable instructions. The executable instructions may include one or more instructions that are executable by a computer, such as the processor 734.

The fabrication process 728 may be implemented by a fabrication system that is fully automated or partially automated. For example, the fabrication process 728 may be automated and may perform processing steps according to a schedule. The fabrication system may include fabrication equipment (e.g., processing tools) to perform one or more operations to form an electronic device. For example, the fabrication equipment may be configured to form integrated circuit elements using integrated circuit manufacturing processes (e.g., wet etching, dry etching, deposition, planarization, lithography, or a combination thereof).

The fabrication system may have a distributed architecture (e.g., a hierarchy). For example, the fabrication system may include one or more processors, such as the processor 734, one or more memories, such as the memory 735, and/or controllers that are distributed according to the distributed architecture. The distributed architecture may include a high-level processor that controls or initiates operations of one or more low-level systems. For example, a high-level portion of the fabrication process 728 may include one or more processors, such as the processor 734, and the low-level systems may each include or may be controlled by one or more corresponding controllers. A particular controller of a particular low-level system may receive one or more instructions (e.g., commands) from a high-level system, may issue sub-commands to subordinate modules or process tools, and may communicate status data back to the high-level system. Each of the one or more low-level systems may be associated with one or more corresponding pieces of fabrication equipment (e.g., processing tools). In a particular embodiment, the fabrication system may include multiple processors that are distributed in the fabrication system. For example, a controller of a low-level system component of the fabrication system may include a processor, such as the processor 734.

Alternatively, the processor 734 may be a part of a high-level system, subsystem, or component of the fabrication system. In another embodiment, the processor 734 includes distributed processing at various levels and components of a fabrication system.

Thus, the memory 735 may include processor-executable instructions that, when executed by the processor 734, cause the processor 734 to initiate or control formation of a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6).

The die 736 may be provided to a packaging process 738 where the die 736 is incorporated into a representative package 740. For example, the package 740 may include the single die 736 or multiple dies, such as a system-in-package (SiP) arrangement. The package 740 may be configured to conform to one or more standards or specifications, such as Joint Electron Device Engineering Council (JEDEC) standards.

Information regarding the package 740 may be distributed to various product designers, such as via a component library stored at a computer 746. The computer 746 may include a processor 748, such as one or more processing cores, coupled to a memory 750. A printed circuit board (PCB) tool may be stored as processor executable instructions at the memory 750 to process PCB design information 742 received from a user of the computer 746 via a user interface 744. The PCB design information 742 may include physical positioning information of a packaged electronic device on a circuit board, the packaged electronic device corresponding to the package 740 including a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6).

The computer 746 may be configured to transform the PCB design information 742 to generate a data file, such as a GERBER file 752 with data that includes physical positioning information of a packaged electronic device on a circuit board, as well as layout of electrical connections such as traces and vias, where the packaged electronic device corresponds to the package 740 including a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6). In other embodiments, the data file generated by the transformed PCB design information may have a format other than a GERBER format.

The GERBER file 752 may be received at a board assembly process 754 and used to create PCBs, such as a representative PCB 756, manufactured in accordance with the design information stored within the GERBER file 752. For example, the GERBER file 752 may be uploaded to one or more machines to perform various steps of a PCB production process. The PCB 756 may be populated with electronic components including the package 740 to form a representative printed circuit assembly (PCA) 758.

The PCA 758 may be received at a product manufacturer 760 and integrated into one or more electronic devices, such as a first representative electronic device 762 and a second representative electronic device 764. As an illustrative, non-limiting example, the first representative electronic device 762, the second representative electronic device 764, or both, may be selected from a mobile phone, a tablet, a computer, a communications device, a set top box, a music player, a video player, an entertainment unit, a navigation device, a personal digital assistant (PDA), and a fixed location data unit, into which a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6), are integrated. As another illustrative, non-limiting example, one or more of the electronic devices 762 and 764 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 7 illustrates remote units according to teachings of the disclosure, the disclosure is not limited to these illustrated units. Embodiments of the disclosure may be suitably employed in any device which includes active integrated circuitry including memory and on-chip circuitry.

A device that includes a controller (e.g., corresponding to the memory controller 118 of FIG. 1, the memory controller 218 of FIG. 2, the memory controller 318 of FIG. 3, the memory controller 418 of FIG. 4, or the controller 602 of FIG. 6), a counter (e.g., corresponding to the counter 136 of FIG. 1, the counter 236 of FIG. 2, the counter 336 of FIG. 3, the counter 436 of FIG. 4, or the counter 604 of FIG. 6), and/or a remapping device (e.g., corresponding to the remapping device 124 of FIG. 1, the remapping device 224 of FIG. 2, the remapping device 324 of FIG. 3, the remapping device 424 of FIG. 4, or the remapping device 606 of FIG. 6), may be fabricated, processed, and incorporated into an electronic device, as described in the illustrative manufacturing process 700. One or more aspects of the embodiments disclosed with respect to FIGS. 1-6 may be included at various processing stages, such as within the library file 712, the GDSII file 726, and the GERBER file 752, as well as stored at the memory 710 of the research computer 706, the memory 718 of the design computer 714, the memory 750 of the computer 746, the memory of one or more other computers or processors (not shown) used at the various stages, such as at the board assembly process 754, and also incorporated into one or more other physical embodiments such as the mask 732, the die 736, the package 740, the PCA 758, other products such as prototype circuits or devices (not shown), or any combination thereof. Although various representative stages are depicted with reference to FIGS. 1-6, in other embodiments fewer stages may be used or additional stages may be included. Similarly, the process 700 of FIG. 7 may be performed by a single entity or by one or more entities performing various stages of the manufacturing process 700.

In conjunction with the described embodiments, a non-transitory computer-readable medium stores instructions that, when executed by a processor, cause the processor to store, at a counter, a value indicating a count of read operations where a bit error is detected in data associated with a first address. The non-transitory computer readable medium may further store instructions that, when executed by the processor, cause the processor to, in response to the first value exceeding a first threshold value, remap the first address to a second address using a controller that is coupled to a memory array. The first address may correspond to a first cell of the memory array. The second address may correspond to a second cell that is included at a memory within the controller. Remapping the first address may include, in response to receiving a read request for data located at the first address, replacing a first bit value read from the first cell with a second bit value read from the second cell to generate modified data.

The non-transitory computer-readable medium may correspond to the memory device 102 of FIG. 1, the memory device 202 of FIG. 2, the memory device 302 of FIG. 3, the memory device 402 of FIG. 4, and the memory 632 of FIG. 6. The processor may correspond to the processor 612 of FIG. 6. The controller may correspond to the memory controller 118 of FIG. 1, the memory controller 218 of FIG. 2, the memory controller 318 of FIG. 3, the memory controller 418 of FIG. 4, or the controller 602 of FIG. 6. The counter may correspond to the counter 136 of FIG. 1, the counter 236 of FIG. 2, the counter 336 of FIG. 3, the counter 436 of FIG. 4, or the counter 604 of FIG. 6. The memory array may correspond to the memory array 104 of FIG. 1, the memory array 204 of FIG. 2, the memory array 304 of FIG. 3, the memory array 404 of FIG. 4, or the memory array 608 of FIG. 6.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in memory, such as random-access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM). The memory may include any form of non-transient storage medium known in the art. An exemplary storage medium (e.g., memory) is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for bit recovery, the method comprising:
storing, at a counter, a first value indicating a count of read operations in which a bit error is detected in data associated with a first address, the first address corresponding to a first set of elements of a memory array;
in response to the first value exceeding a first threshold value, mapping, by a controller that is coupled to the memory array, the first address to a second element that is included at a memory within the controller, wherein mapping of the first address to the second element comprises storing mapping data that includes the first address and a second bit value at the memory within the controller; and in response to receiving a first read request for data located at the first address, replacing a first bit value read from the first set of elements with the second bit value read from the second element to generate modified data.

2. The method of claim 1, wherein storing the first value comprises incrementing the first value in response to detecting the bit error in the data in connection with a read operation and the first address.

3. The method of claim 1, wherein mapping the first address further comprises, prior to receiving the first read request, writing the second bit value at a second element in response to receiving, at the controller, the second bit value from a write instruction from an external memory device or from an error correcting code (ECC) engine.

4. The method of claim 1, further comprising:
storing, at the counter, a second value indicating a count of read operations that include an uncorrectable bit error detected in data associated with a third address, the third address corresponding to a first cell block of the memory array;
in response to the second value exceeding a second threshold value, mapping the third address to a second cell block of the memory within the controller; and
in response to receiving a second read request for data located at the third address, replacing a first plurality of bit values read from the first cell block with a second plurality of bit values read from the second cell block.

5. The method of claim 4, wherein the third address matches the first address.

6. The method of claim 1, wherein a second counter indicates read operations corresponding to detected uncorrectable bit errors at the memory array, wherein the first set of elements is a first block of the memory array, and wherein the second element is a second block that is included at the memory within the controller.

7. The method of claim 6, further comprising, in response to receiving the first read request, replacing a first plurality of bit values read from the first block with a second plurality of bit values read from the second block.

8. The method of claim 1, wherein a second counter indicates read operations corresponding to detected uncorrectable bit errors at the memory array, and wherein the second counter is included in a second memory within the controller.

9. The method of claim 1, wherein mapping the first address to the second element comprises generating the mapping data, wherein the mapping data includes an offset value that indicates a position of a particular element of the first set of elements, and wherein the particular element stores the first bit value.

10. The method of claim 1, further comprising, prior to storing the first value at the counter, receiving one or more error correcting code (ECC) flags from the memory array that indicate detection of the bit error in the data associated with the first address, wherein the first value is based on the ECC flags.

11. The method of claim 1, further comprising, in response to generating the modified data, performing an error correcting code (ECC) operation on the modified data, wherein performing the ECC operation comprises correcting a correctable bit error in the modified data.

12. The method of claim 1, wherein storing the first value and mapping the first address are initiated by a processor integrated into an electronic device.

13. An apparatus comprising:
a controller configured to be coupled to a memory array, the controller comprising:
a memory;
a counter configured to store a value indicating a count of read operations in which a bit error is detected in data associated with a first address, wherein the first address corresponds to a first set of elements of the memory array; and
a mapping device configured to, in response to the value at the counter exceeding a first threshold value, store mapping data at the memory to map the first address to a second element that is included at the memory, wherein the mapping data includes the first address and a second bit value, and wherein, in response to receiving a read request for data located at the first address, the mapping device is configured to cause a first bit value read from a first element of the first set of elements to be replaced with the second bit value read from the second element to generate modified data.

14. The apparatus of claim 13, further comprising a merger unit configured to merge a first portion of data from a location of the memory array with a second portion of the data from a corresponding location of the memory within the controller.

15. The apparatus of claim 13, further comprising a multiplexer configured to replace the first bit value with the second bit value and configured to direct write data for the first element to the second element.

16. The apparatus of claim 13, wherein the counter is configured to indicate read operations corresponding to detected correctable bit errors at the memory array, wherein the memory array comprises a dynamic random access memory (DRAM), and wherein the memory comprises a static random access memory (SRAM).

17. An apparatus comprising:
control means configured to be coupled to a memory array, the control means comprising:
means for storing a value indicating a count of read operations in which a bit error is detected in data associated with a first address, wherein the first address corresponds to a first element of the memory array;
means for generating mapping data to map the first address to a second element in response to the value at the means for storing exceeding a threshold value, wherein the second element is included at means for storing data within the control means, wherein the mapping data includes the first address and a second bit value; and
means for causing a first bit value read from the first element to be replaced with a second bit value read from the second element to generate modified data in response to receiving a read request for data located at the first address.

18. A non-transitory computer readable medium storing instructions that, when executed by a processor, cause the processor to:
store, at a counter, a value indicating a count of read operations in which a bit error is detected in data associated with a first address, the first address corresponding to a first set of elements of a memory array;
in response to the value exceeding a first threshold value, store mapping data at a memory within the controller to map the first address to a second element that is included at the memory within the controller, wherein the mapping data includes the first address and a second bit value; and in response to receiving a read request for data located at the first address, replace a first bit value read from the first element with a second bit value read from the second element.

19. The non-transitory computer readable medium of claim 18, further comprising an electronic device including a mobile phone, a tablet, a computer, a communications device, a set top box, a music player, a video player, an entertainment unit, a navigation device, a personal digital assistant (PDA), or a fixed location data unit.

20. The method of claim 1, further comprising, in response to receiving the first read request for data located at the first address:

reading first data from the memory array based on the first address; and accessing the memory within the controller.

21. The method of claim 20, further comprising:

identifying the mapping data stored at the memory within the controller based on the first address; and reading the mapping data that includes the second bit value.

22. The apparatus of claim 14, further comprising a splitter unit configured to extract a third portion and a fourth portion of the data, to transmit the third portion of the data to the location, and to transmit the fourth portion of the data to the corresponding location.

23. The apparatus of claim 13, wherein the controller further comprises an in-system error correcting code (ECC) engine, and wherein the memory array includes an in-memory ECC engine.

24. The method of claim 1, wherein storing the mapping data comprises storing the mapping data at an entry of the memory within the controller.

25. The method of claim 24, wherein the entry is a single entry.

26. The method of claim 1, further comprising, in response to receiving the first read request for the data located at the first address, reading the mapping data that includes the first address and the second bit value at the memory within the controller.

27. The method of claim 26, wherein the reading of the mapping data comprises performing a single access operation to read the mapping data.

28. The method of claim 1, further comprising, prior to receiving the first read request, writing the second bit value at the second element in response to receiving, at the controller, the second bit value from a write instruction from an external memory device.

29. The method of claim 28, wherein writing the second bit value at the second element comprises performing a single write operation to write the mapping data in the memory.

30. The method of claim 1, wherein the first address and the second bit value are stored at the same row of the memory within the controller.

* * * * *